(12) United States Patent
Bangar et al.

(10) Patent No.: US 10,731,634 B2
(45) Date of Patent: Aug. 4, 2020

(54) TRANSPORTATION AND STORAGE SYSTEM FOR A WIND TURBINE BLADE

(71) Applicant: LM Wind Power US Technology ApS, Kolding (DK)

(72) Inventors: Rahul Bangar, Bangalore Karnataka (IN); Jacobus Van Der Zee, Kolding (DK); Nikolaj Olesen, Hinnerup (DK)

(73) Assignee: LM WIND POWER US TECHNOLOGY APS, Kolding (DK)

( * ) Notice: Subject to any disclaimer, the term of this patent is extended or adjusted under 35 U.S.C. 154(b) by 0 days.

(21) Appl. No.: 16/329,447

(22) PCT Filed: Sep. 1, 2017

(86) PCT No.: PCT/EP2017/071953
§ 371 (c)(1),
(2) Date: Feb. 28, 2019

(87) PCT Pub. No.: WO2018/041993
PCT Pub. Date: Mar. 8, 2018

(65) Prior Publication Data
US 2019/0219031 A1    Jul. 18, 2019

(30) Foreign Application Priority Data
Sep. 2, 2016 (EP) ..................................... 16186986

(51) Int. Cl.
*F03D 13/40* (2016.01)
*F03D 13/00* (2016.01)

(52) U.S. Cl.
CPC ............. *F03D 13/40* (2016.05); *F03D 13/00* (2016.05); *F05B 2240/221* (2013.01); *F05B 2260/02* (2013.01); *Y02E 10/72* (2013.01)

(58) Field of Classification Search
CPC .. F03D 13/40; A47B 47/0091; F05B 2240/30; F05B 2260/02; F16B 2/08
See application file for complete search history.

(56) References Cited

U.S. PATENT DOCUMENTS 6,983,844 B2 * 1/2006 O'Kane ................. B65D 85/68
206/319
7,591,621 B1 * 9/2009 Landrum .................. B60P 3/40
410/44

(Continued)

FOREIGN PATENT DOCUMENTS

DE    102010003694 A1 * 10/2011 ................ B60P 3/40
EP    2333315 A2    6/2011

(Continued)

OTHER PUBLICATIONS

International Search Report dated Oct. 5, 2017 corresponding to application No. PCT/EP2017/071953.

*Primary Examiner* — Stanton L Krycinski
(74) *Attorney, Agent, or Firm* — Nath, Goldberg & Meyer; Jerald L. Meyer; Tanya E. Harkins

(57) ABSTRACT

The present invention relates to a transportation and storage system for a wind turbine blade (10), the system comprising a root frame assembly and a tip frame assembly. The frame assemblies comprise lateral frame parts (72, 74) each having a top member (84), a bottom member (86), a center beam (88), a first and a second upper inclined beam (90, 92) and a first and a second lower inclined beam (94, 96). The present invention also relates to the use of the system for transporting and/or storing one or more wind turbine blades.

22 Claims, 5 Drawing Sheets

(56) References Cited

U.S. PATENT DOCUMENTS

Figure 1:
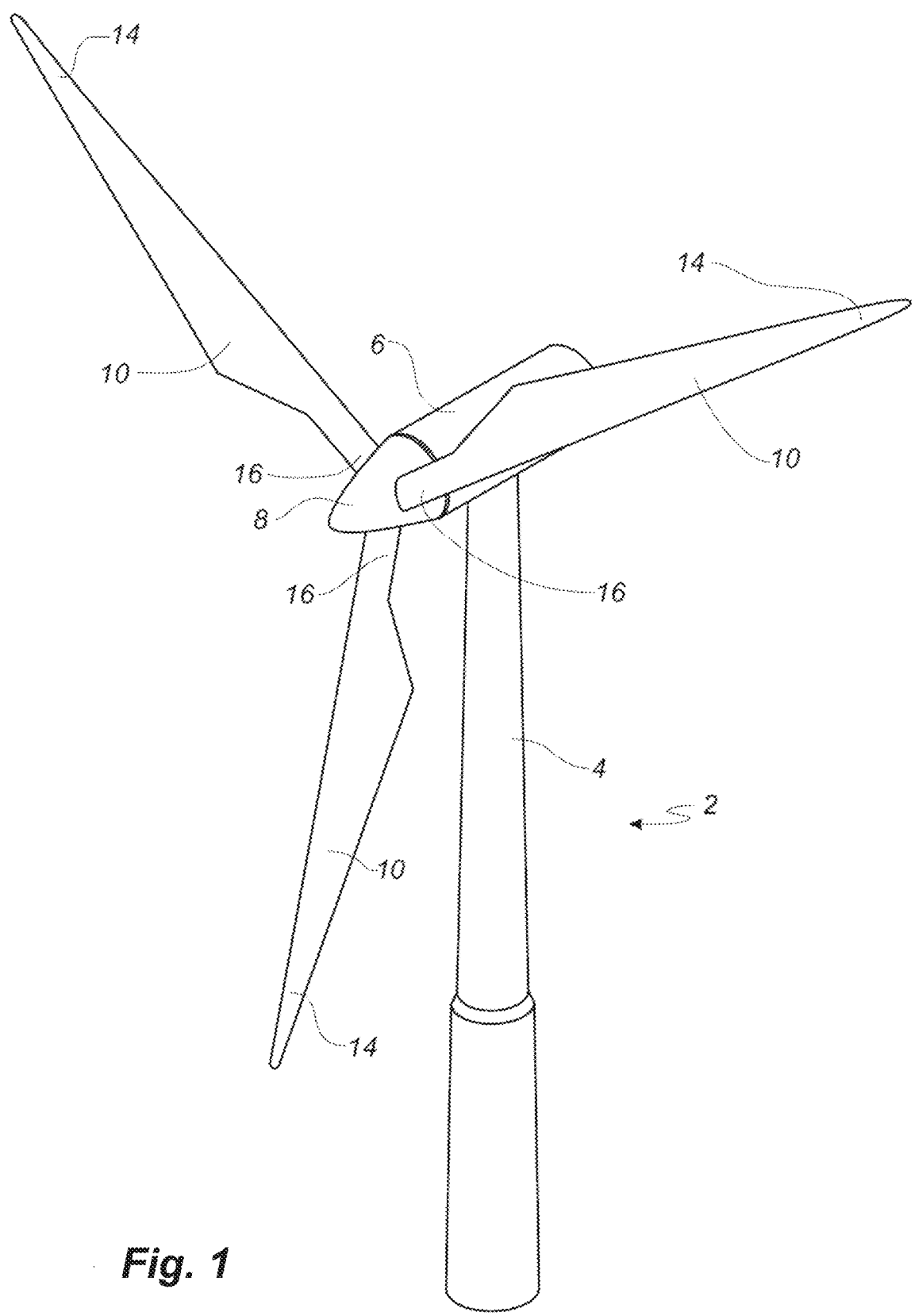

| | | | |
|---|---|---|---|
| 7,690,875 B2* | 4/2010 | Grabau | B60P 3/40 410/34 |
| 7,704,024 B2* | 4/2010 | Kootstra | B60P 3/40 410/44 |
| 7,967,536 B2* | 6/2011 | Broderick | B60P 3/40 410/120 |
| 8,056,203 B2* | 11/2011 | Madsen | B60P 3/40 29/407.09 |
| 8,177,462 B2* | 5/2012 | Riddell | B60P 3/40 410/31 |
| 8,240,962 B2* | 8/2012 | Livingston | F03D 1/0675 410/120 |
| 8,313,272 B2* | 11/2012 | Koike | F03D 13/40 410/44 |
| 8,342,491 B2* | 1/2013 | Jorgensen | F03D 13/40 269/17 |
| 8,511,921 B2* | 8/2013 | Riddell | B60P 3/40 401/44 |
| 8,562,302 B2* | 10/2013 | Bakhuis | B60P 3/40 269/37 |
| 8,602,700 B2* | 12/2013 | Johnson | F03D 13/40 410/44 |
| 8,622,670 B2* | 1/2014 | Vitor | B65D 61/00 410/120 |
| 8,632,286 B2* | 1/2014 | Wessel | F03D 80/00 410/35 |
| 8,672,131 B2* | 3/2014 | Nogueira | B65D 85/68 206/521 |
| 8,753,050 B2* | 6/2014 | Cyrus | B60P 3/40 410/120 |
| 8,967,929 B2* | 3/2015 | Frederiksen | B60P 3/40 410/44 |
| 9,086,052 B2* | 7/2015 | Hiremath | F03D 1/005 |
| 9,199,570 B2* | 12/2015 | Pedersen | B60P 3/40 |
| 9,260,875 B2* | 2/2016 | Bjoernskov | E04H 12/08 |
| 9,347,426 B2* | 5/2016 | Landrum | F03D 1/005 |
| 9,434,291 B2* | 9/2016 | Kelly | B60P 3/40 |
| 9,494,140 B2* | 11/2016 | Sigurdsson | A47B 81/00 |
| 2006/0251517 A1* | 11/2006 | Grabau | B60P 3/40 416/202 |
| 2007/0177954 A1* | 8/2007 | Kootstra | B60P 3/40 410/44 |
| 2007/0189895 A1* | 8/2007 | Kootstra | B60P 3/40 416/9 |
| 2007/0253829 A1* | 11/2007 | Wessel | F03D 80/00 416/244 R |
| 2009/0003957 A1* | 1/2009 | Llorente Gonzalez | B65D 85/68 410/35 |
| 2009/0020445 A1* | 1/2009 | Koike | H01M 8/0252 206/319 |
| 2009/0169323 A1* | 7/2009 | Livingston | F03D 1/0675 410/120 |
| 2010/0252977 A1* | 10/2010 | Jorgensen | F03D 13/40 269/287 |
| 2011/0142660 A1* | 6/2011 | Bakhuis | B60P 3/40 416/223 R |
| 2011/0308205 A1* | 12/2011 | Vitor | B65D 61/00 53/475 |
| 2012/0124833 A1* | 5/2012 | Arendt | F03D 13/10 29/889.7 |
| 2012/0192420 A1* | 8/2012 | Krogh | F03D 1/005 29/889 |
| 2013/0119002 A1* | 5/2013 | Frederiksen | B60P 3/40 211/60.1 |
| 2013/0121780 A1* | 5/2013 | Ressel | B60P 3/40 410/44 |
| 2013/0216325 A1* | 8/2013 | Johnson | F03D 13/40 410/44 |
| 2013/0319891 A1* | 12/2013 | Lieberknecht | B65D 85/68 206/448 |
| 2014/0193255 A1* | 7/2014 | Hancock | F03D 7/022 416/1 |
| 2014/0305743 A1* | 10/2014 | Poulsen | B65G 1/0442 187/244 |
| 2014/0314576 A1* | 10/2014 | Lieberknecht | F01D 5/32 416/220 R |
| 2014/0353266 A1* | 12/2014 | Frederiksen | B60P 3/40 211/60.1 |
| 2015/0192104 A1* | 7/2015 | Lulker | F03D 13/40 206/493 |
| 2015/0198140 A1* | 7/2015 | Sigurdsson | A47B 81/00 211/60.1 |
| 2015/0369209 A1* | 12/2015 | Datta | B60P 3/40 211/85.8 |

FOREIGN PATENT DOCUMENTS

| | | |
|---|---|---|
| EP | 2832988 A1 | 2/2015 |
| EP | 2418376 B1 | 4/2016 |
| EP | 2628945 B1 | 11/2017 |

* cited by examiner

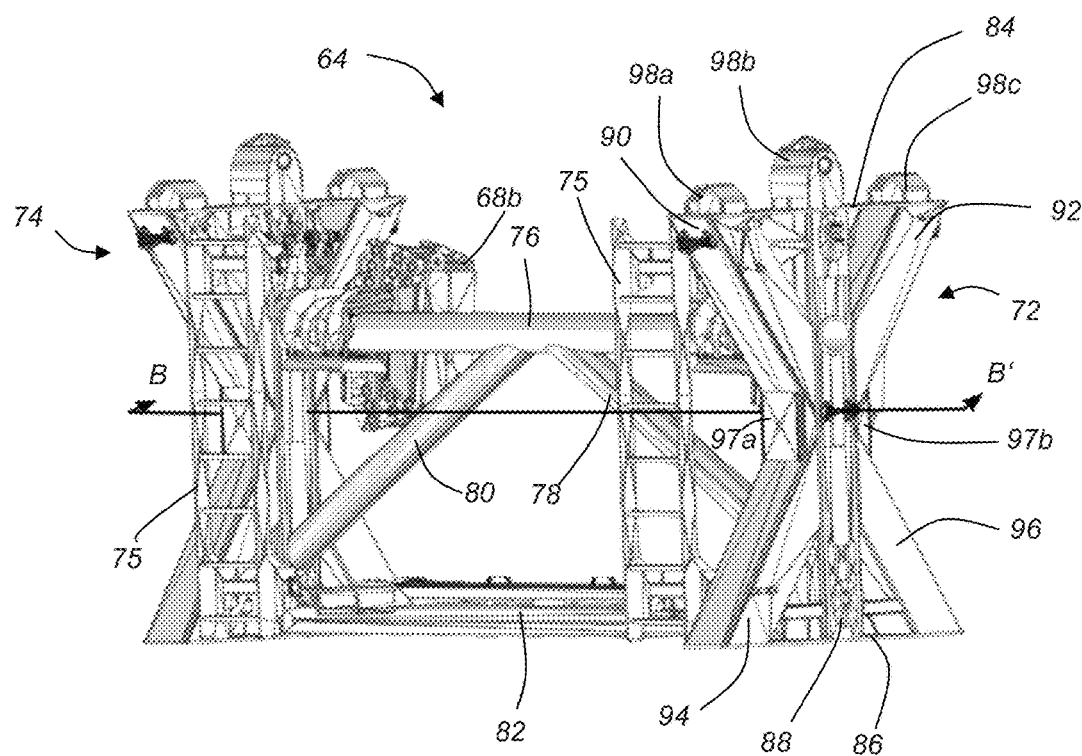
Fig. 6
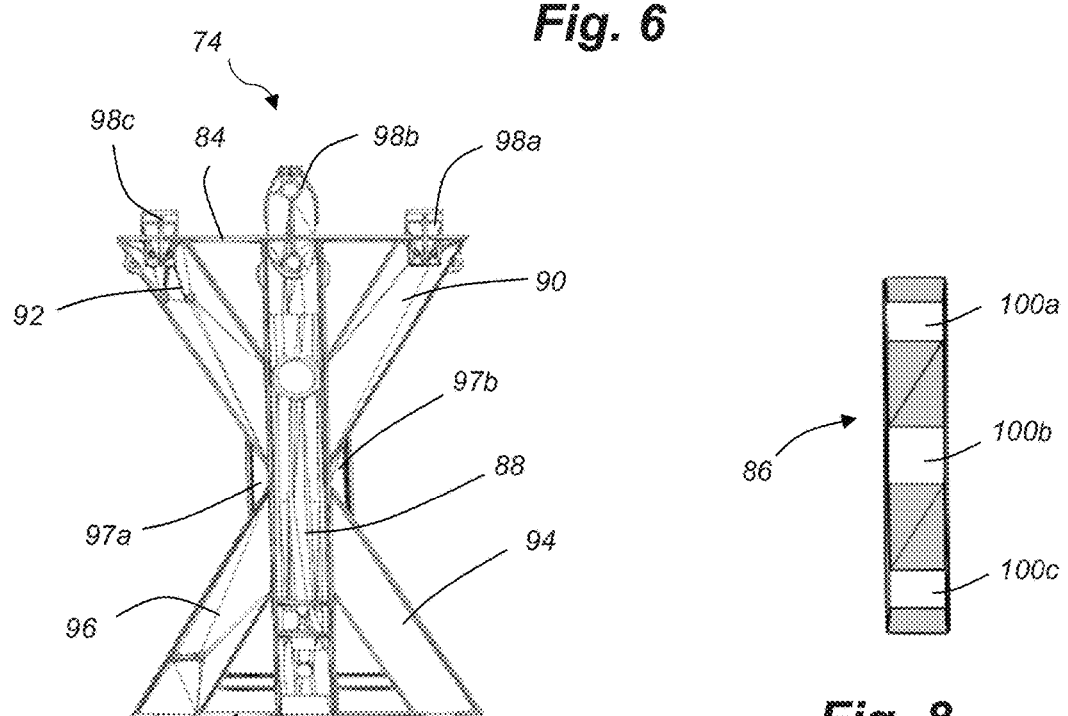
Fig. 7
Fig. 8

TRANSPORTATION AND STORAGE SYSTEM FOR A WIND TURBINE BLADE

This is a National Phase Application filed under 35 U.S.C. 371 as a national stage of PCT/EP2017/071953, filed Sep. 1, 2017, an application claiming the benefit of European Application No. 16186986.2, filed Sep. 2, 2016, the content of each of which is hereby incorporated by reference in its entirety.

FIELD OF THE INVENTION

The present invention relates to a transportation and storage system for a wind turbine blade. In another aspect, the present invention relates to the use of the system for transporting and/or storing one or more wind turbine blades.

BACKGROUND OF THE INVENTION

Wind power is becoming increasingly popular due to its clean and environmentally friendly production of energy. The rotor blades of modern wind turbines capture kinetic wind energy by using sophisticated blade design created to maximize efficiency. Turbine blades may today exceed 80 metres in length and 4 metres in width. The blades are typically made from a fibre-reinforced polymer material and comprise a pressure side shell half and a suction side shell half. The cross-sectional profile of a typical blade includes an airfoil for creating an air flow leading to a pressure difference between both sides. The resulting lift force generates torque for producing electricity.

Transporting wind turbine blades from a production site to a wind power plant requires many transportation steps. Typically, the blades are transported by truck, train or ship and again by truck to the site of the wind power plant. Additionally, reloading between the different types of transportation is needed. Finally, the blades are stored at the production facility and at the site of the wind turbine power plant. Due to the size and fragility of large rotor blades, the blades may be damaged during transport as well as during loading and unloading. Such damage may seriously degrade the performance of the blades. Therefore, the blades need to be carefully packaged in order to ensure that they are not damaged.

In view of the increasing dimensions of modern wind turbine blades, it is becoming more challenging and costly to transport the blades. Transportation costs may amount to as much as 20 percent of the total costs for manufacturing, transporting and mounting the wind turbine blade on the rotor of a wind turbine blade. In addition, some blades are transported to the wind power plant using different modes of transport, such as by truck, train and ship. Some of these modes of transports may have restrictions on large loads, maximum heights, maximum widths, maximum distances between transport frames or supports, for instance dictated by local regulations. Therefore, there exists a logistic problem of providing transport solutions that are suitable for various types of transport.

Overall, there is a demand for making transport solutions simpler, safer and cheaper. In particular, there is a demand for making such systems more flexible such that adaption to a certain transportation situation is possible. This applies for example to shifting from land transport to sea transport. While height restrictions require lowest possible inter-blade spacings, sea transport may require an increased inter-blade spacing to avoid contact between blades during sea disturbance.

WO 2014/064247 describes a transportation and storage system for at least two wind turbine blades. The system is adapted to stack the blades in an alternating root end to tip end arrangement. The tip end of the second wind turbine blade may extend beyond the root end of the first wind turbine blade, and the tip end of the first wind turbine blade may extend beyond the root end of the second wind turbine blade, when the first and the second wind turbine blades are arranged in the packaging system.

EP1387802 discloses a method and system for transporting two straight wind turbine blades, where the root end of a first blade is arranged in a first package frame, and the tip end of a second, neighbouring blade is arranged in a second package frame that is arranged next to and connected to the first package frame with the effect that the blades are stored compactly alongside each other in a "tip-to-root" arrangement. However, in this transport system the tip end frames support the blades at the very tip of the blades, where they are mechanically most fragile. Further, the package frames are arranged at the root end face and the blade tip. Therefore, the distance between the package frames are approximately equal to the length of the blades. For very long blades of 45 metres or longer, this might not be possible due to local regulations and restrictions on transport.

Using some of these prior art approaches for transporting and/or storing increasingly larger wind turbine blades involves the challenge of providing a structure having low weight and high flexibility while maintaining a high standard of structural stability and safety.

It is therefore a first object of the present invention to provide a transportation and storage system for wind turbine blades which overcomes or ameliorates at least one of the disadvantages of the prior art or which provides a useful alternative.

Particularly, it is an object of the present invention to provide a transportation and storage system that is sufficiently light, yet mechanically stable.

It is another object of the present invention to provide a transport and storage solution that is simple and cost-efficient.

SUMMARY OF THE INVENTION

In a first aspect, the present invention relates to a transportation and storage system for a wind turbine blade, the blade having a profiled contour including a pressure side and a suction side, and a leading edge and a trailing edge with a chord having a chord length extending therebetween, the wind turbine blade extending in a spanwise direction between a root end and a tip end, wherein the system comprises a root frame assembly comprising at least one root end receptacle and a root end frame, wherein the root end receptacle is mounted to the root end frame, the system further comprising a tip frame assembly comprising at least one tip end receptacle and a tip end frame, wherein the tip end receptacle is mounted to the tip end frame, wherein the root end frame and/or the tip end frame each comprises a first lateral frame part and a second lateral frame part being laterally spaced apart and being mutually rigidly connected by means of at least one transversely extending transverse frame part, wherein each lateral frame part comprises a top member arranged substantially horizontally,
 a bottom member arranged substantially horizontally opposite the top member,
 a center beam arranged substantially vertically and connecting the top member to the bottom member, a first and a second upper inclined beam arranged in a V-shaped configuration, wherein each upper inclined beam extends between the top member and the center beam, a first and a second lower inclined beam arranged in a V-shaped configuration, wherein each lower inclined beam extends between the bottom member and the center beam.

The first and the second upper inclined beams may extend in the same plane. The first and the second lower inclined beams may extend in the same plane. The first and second upper inclined beams and the first and second lower inclined beams may extend in the same plane.

The first lateral frame part may extend in a first lateral plane. The second lateral frame part may extend in a second lateral plane. The first lateral plane and the second lateral plane may be parallel. The first lateral plane and/or the second lateral plane may be perpendicular to the at least one transversely extending transverse frame part.

The present inventors have found that this setup allows a better and lighter design in comparison to some of the prior art arrangements, while maintaining the necessary mechanical stability. In a preferred embodiment, the first upper inclined beam and the second upper inclined beam form an acute angle and/or the first lower inclined beam and the second lower inclined beam form an acute angle. Preferably, the first and second upper inclined beams extend from the two respective opposing ends of the top member, whereas the first and second lower inclined beams extend from the two respective opposing ends of the bottom member.

In another embodiment, the angle formed between the first upper inclined beam and the second upper inclined beam is the same as the angle formed between the first lower inclined beam and the second lower inclined beam. According to another embodiment, the first upper inclined beam has the same length as the second upper inclined beam and/or the first lower inclined beam has the same length as the second lower inclined beam. Preferably, all inclined beams have the same length.

In a preferred embodiment, the center beam, the first and second upper inclined beams and the first and second lower inclined beams are arranged symmetrically. In such arrangement, the first and second upper inclined beams advantageously form a V-shape, and the first and second lower inclined beams form an inverted V-shape.

In another embodiment, the respective first and second upper inclined beams and the respective first and second lower inclined beams are fastened to the center beam within a region of the center beam which is spaced from the upper and lower end thereof by at least 30% of the total vertical length of the center beam. It is thus preferred that the point of contact between the center beam and the respective inclined beams is close to the midpoint of the center beam as seen in its vertical extension. Preferably, all inclined beams contact the center beam within a region corresponding to not more than 30% of its vertical extension, i.e. a region that is spaced plus/minus 15% of its midpoint.

Preferably, each tip end frame is stackable on top of a root end frame and vice versa, such that the system is operable to stack successive wind turbine blades in an alternating root end to tip end arrangement. In a preferred embodiment, the tip end frame and the root end frame each comprise lower stacking means in a base part thereof and upper stacking means at a top thereof, said lower stacking means being arranged so as to be connected with the upper stacking means by means of locking means to allow stacking of a first tip end frame on top of a second tip end frame, said lower stacking means defining at least a portion of the bottom surface of the tip end frame. Thus, tip end frames and root end frames can be stacked in a tip end to root end configuration. However, with an intermediate frame they can also be stacked in a root end to root end configuration.

In one embodiment, the top member comprises a substantially horizontal upper surface, said upper surface comprising one or more protrusions, and wherein the bottom member comprises a substantially horizontal lower surface, said lower surface comprising one or more cavities for receiving the one more protrusion on the upper surface of the top member of another root end frame or tip end frame in a stacked arrangement.

According to another embodiment, two trapezoid shaped blocks are secured to opposite sides of the center beam for receiving end portions of the first and second upper and lower inclined beams. This was found to result in a particularly stable design.

According to another embodiment, the center beam has a rectangular cross section. In a preferred embodiment, the inclined beams have a rectangular cross section. Preferably, the center beam and/or the inclined beams are hollow. Thus, the frame assemblies of the present invention have an advantageous light design.

In one embodiment, the root end receptacle is hingedly mounted to the root end frame, preferably along a horizontal axis. The root end receptacles may be hingedly supported to prevent large bending moments from entering into the frames.

The root end receptacle may be mounted to the center beam of the first lateral frame part and/or the center beam of the second lateral frame part.

In a preferred embodiment, the root end receptacle is releasably mounted to the root end frame. The root end receptacles may advantageously be dismounted from the root end frame and installed on the blade before loading into the main frame. According to another embodiment, the system comprises two root end receptacles mounted to the root end frame.

Advantageously, each root end receptacle comprises a plurality of through holes for bolting the root end of a wind turbine blade to the root end receptacle. In a preferred embodiment, the through holes are arranged in at least one arc and/or at least one line.

Preferably, the through holes are arranged for bolting root ends of at least two different diameters to the root end receptacle. It is particularly preferred that the through holes are arranged to receive three different blade types with different bolt patterns.

According to another embodiment, the root end receptacle comprises a block of material, said block comprising an arched supporting surface for receiving the root end of a wind turbine blade. The arched supporting surface advantageously corresponds to part of the outer surface of the root end of a wind turbine blade and is preferably made of a material preventing scratching of the surface of the blade. In one embodiment, the supporting surface of the root end receptacle is shaped so as to at least partly conform to a surface contour of root end of the blade.

In a preferred embodiment, the tip end receptacle is a tip end clamp. The tip end clamp may comprise a supporting surface for receiving the wind turbine blade close to its tip end. The supporting surface may be made of a flexible material being able to at least partially adapt to the surface of the blade. The supporting surface is preferably made of a material preventing scratching of the surface of the blade. The non-scratching supporting surface can be formed of a wood material, a rubber material, a textile material or a polymer material, e.g. a foamed polymer, such as foamed polyurethane.

The supporting surface of the tip end clamp may furthermore comprise a padding that is graded in hardness so that the largest forces are diverted to the main laminate on which the blade is supported.

According to another embodiment, the tip end receptacle is slidable in at least one direction, preferably a horizontal direction. Preferably, the tip end receptacle is slidable in the z-direction, such as plus/minus 50 mm, to allow the blade to move freely when swinging. The tip end receptacle may also hinge around the x-direction. The tip end receptacles may be removed without the requirement to remove the entire frame.

In one embodiment, the tip end receptacle is hingedly mounted to the tip end frame. According to another embodiment, the tip end receptacle is releasably mounted to the tip end frame.

The tip end receptacle may be mounted to the center beam of the first lateral frame part and/or the center beam of the second lateral frame part.

In one embodiment, the transverse frame part comprises one or more horizontally arranged bars interconnecting the first and second lateral frame parts. In a preferred embodiment, the horizontally arranged bar has a circular cross section for receiving at least one clamp ring of a root end receptacle. In addition, the transverse frame part may further comprise a first and a second reinforcing bar, preferably in an inclined orientation, and a transverse, substantially horizontally arranged, base member interconnecting the first and second lateral frame parts.

According to another embodiment, the root frame assembly and/or the tip frame assembly comprises at least one ladder, preferably two ladders. This is advantageous for allowing operational staff to install and dismount receptacles and/or blades.

In another aspect, the present invention relates to the use of a system according to the present invention for transporting and/or storing one or more wind turbine blades.

In another aspect, the present invention relates to a transportation and storage system for a wind turbine blade, the blade having a profiled contour including a pressure side and a suction side, and a leading edge and a trailing edge with a chord having a chord length extending therebetween, the wind turbine blade extending in a spanwise direction between a root end and a tip end, wherein the system comprises a root frame assembly comprising at least one root end receptacle and a root end frame, wherein the root end receptacle is mounted to the root end frame, wherein the root end receptacle comprises a block of material, said block comprising an arched supporting surface for receiving the root end of a wind turbine blade, wherein the root end frame assembly, such as the root end frame, comprises an upwardly open space, such as a plurality of upwardly open spaces, for receiving a plurality of stay bolts fixed to the root end of a wind turbine blade. The block may comprise the plurality of upwardly open spaces.

The advantage of this root frame assembly is that it can easily be used for offshore blades since the blades can be removed directly vertically upwards and out of the assembly whilst on installation vessels. This is in particular facilitated by the block with the arched supporting surface, preferably having the shape of a half moon. The block with the half moon surface is preferably hingedly connected to the root end frame. The arched supporting surface advantageously corresponds to part of the outer surface of the root end of a wind turbine blade and is preferably made of a material preventing scratching of the surface of the blade.

DETAILED DESCRIPTION OF THE INVENTION

Figure 2:
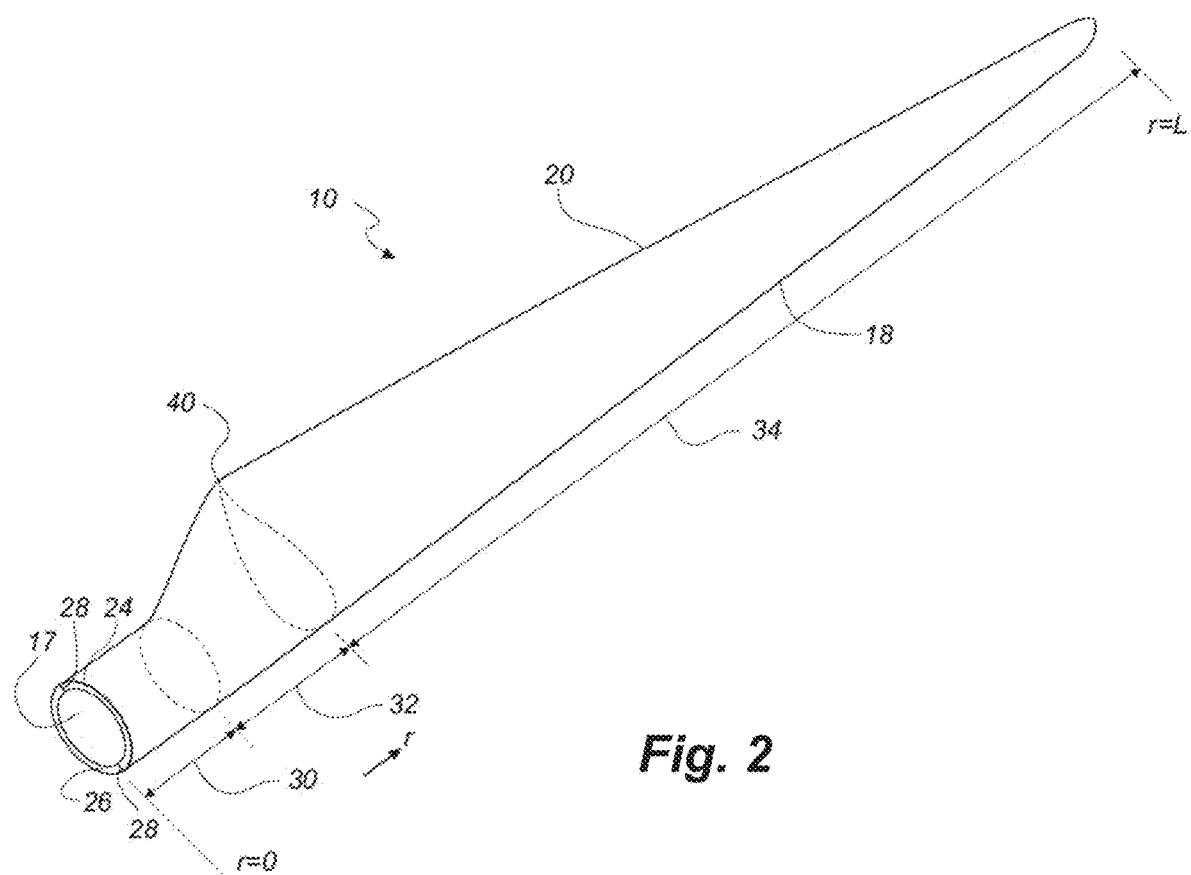
Figure 3:
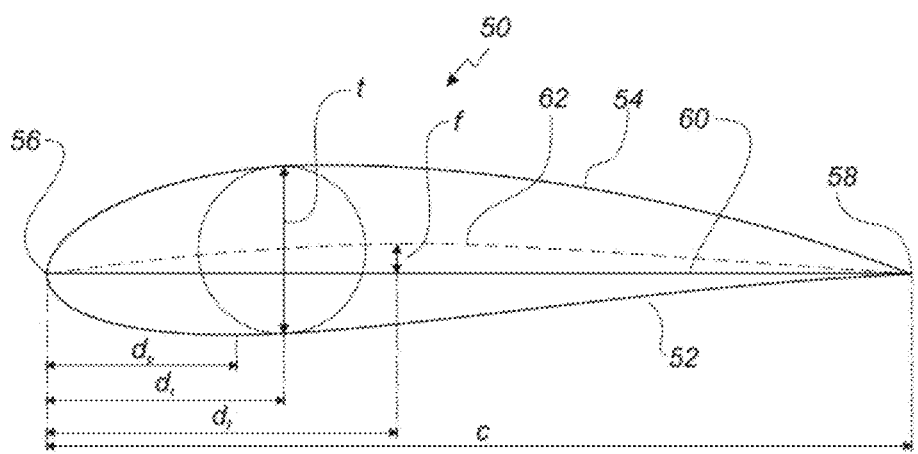
Figure 4:
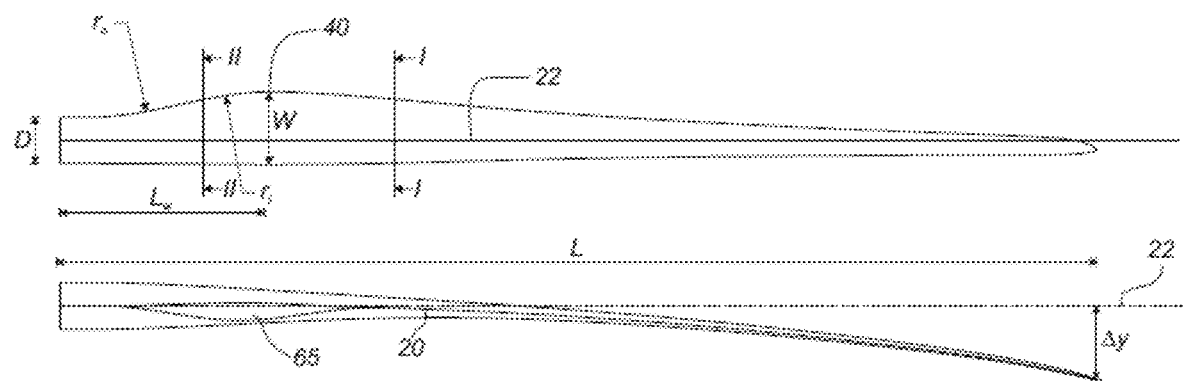
Figure 5:
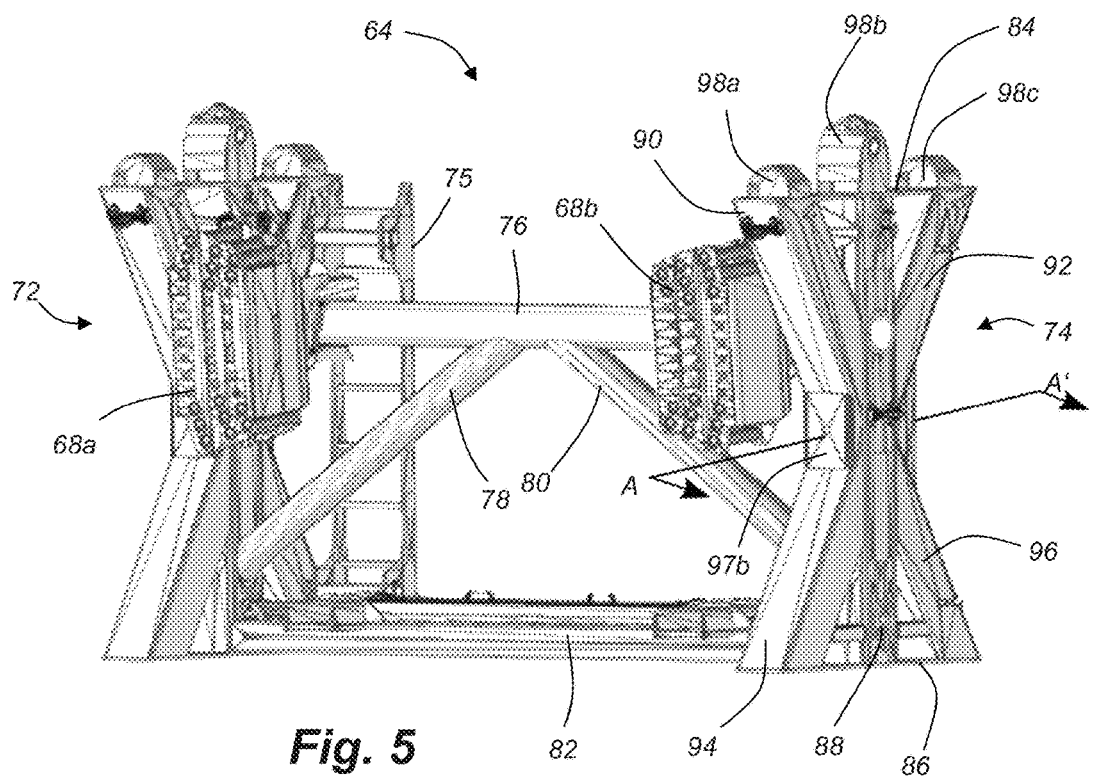
Figure 9:
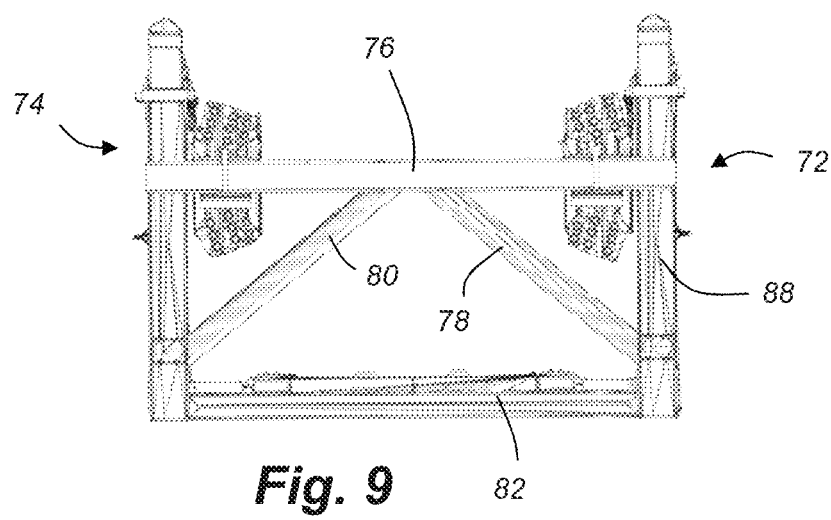
Figures 10, 11:
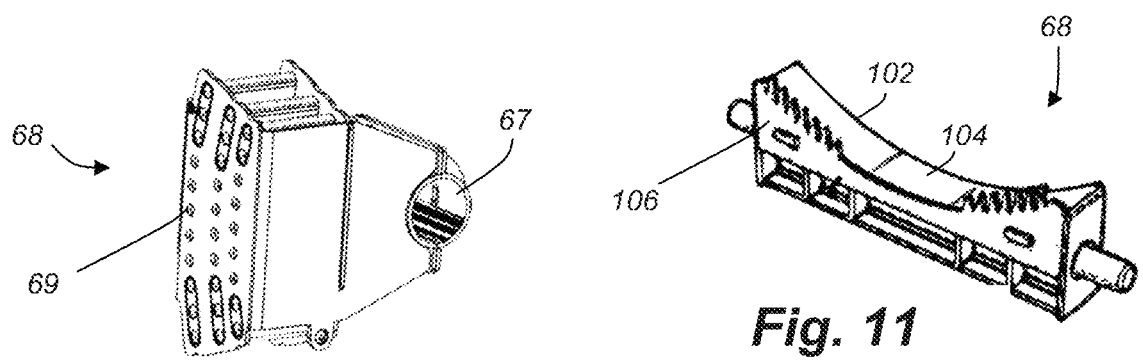
Figure 12:
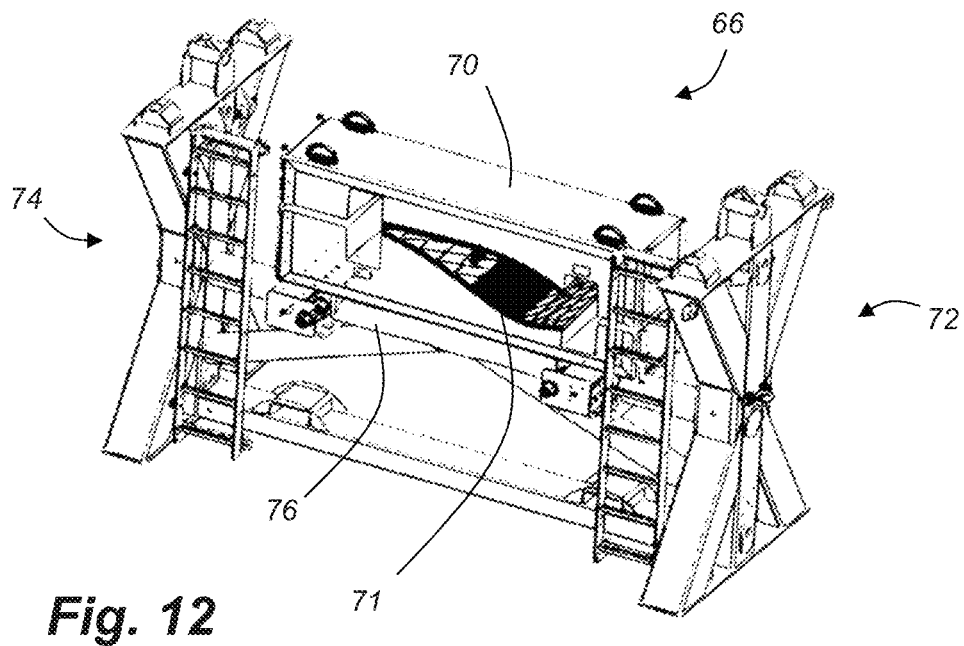

The invention is explained in detail below with reference to embodiments shown in the drawings, in which FIG. 1 shows a wind turbine, FIG. 2 shows a schematic view of a wind turbine blade, FIG. 3 shows a schematic view of an airfoil profile through section I-I of FIG. 4, FIG. 4 shows a schematic view of the wind turbine blade, seen from above and from the side, FIG. 5 shows a perspective view of a root frame assembly according to the present invention, FIG. 6 shows another perspective view of a root frame assembly according to the present invention, FIG. 7 is a sectional view along the line A-A' in FIG. 5, FIG. 8 is a top view of a bottom member of a root frame assembly according to the present invention, FIG. 9 is a sectional view along the line B-B' in FIG. 6, FIG. 10 is a perspective view of a root end receptacle according to the present invention, and FIG. 11 is a perspective view of another type of root end receptacle according to the present invention, and FIG. 12 is a perspective view of a tip frame assembly according to the present invention.

DETAILED DESCRIPTION

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder

40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIGS. 3 and 4 depict parameters which are used to explain the geometry of the wind turbine blade according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 or chord line with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position $r=L_w$, and has a shoulder width W, which equals the chord length at the shoulder 40. The diameter of the root is defined as D. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as Δy, which corresponds to the out of plane deflection from a pitch axis 22 of the blade.

FIGS. 5 and 6 are perspective front and rear views of a root frame assembly 64 according to the present invention. The root frame assembly 64 includes two one root end receptacles 68*a*, 68*b* mounted to a root end frame comprising a first lateral frame part 72 and a second lateral frame part 74 rigidly connected by a transversely extending transverse frame part comprising a horizontally oriented transverse bar 76. Each lateral frame part 72, 74 comprises a horizontally arranged top member 84 and a horizontally arranged bottom member 86.

The lateral frame parts 72, 74 also comprise a center beam 88 arranged substantially vertically and connecting the top member 84 to the bottom member 86. A first and a second upper inclined beam 90, 92 are arranged in a V-shaped configuration, wherein each upper inclined beam 90, 92 extends between the top member 84 and the center beam 88. Similarly, a first and a second lower inclined beam 94, 96 are arranged in a V-shaped configuration, wherein each lower inclined beam 94, 96 extends between the bottom member 86 and the center beam 88.

Both the first upper inclined beam 90 and the second upper inclined beam 92 form an acute angle as well as the first lower inclined beam 94 and the second lower inclined beam 96 resulting in a symmetric arrangement of the center beam 88, the inclined beams 90, 92, 94, 96 and the top and bottom members 84, 86. This is best seen in the cross sectional view of FIG. 7, which is taken along the line A-A' in FIG. 5.

As seen in FIGS. 5-7, two trapezoid shaped blocks 97*a*, 97*b* are secured to opposite sides of the center beam 88 for receiving end portions of the first and second upper and lower inclined beams 90, 92, 94, 96. The inclined beams are fastened to the center beam 88 close to the midpoint of its vertical length extension, i.e. within a region of the center beam which is spaced from the upper and lower end thereof by at least 30% of the total vertical length of the center beam.

As best seen in FIG. 7, the top member 84 comprises a horizontal upper surface comprising three protrusions 98*a*, 98*b*, 98*c*. Also, the bottom member 86 comprises a horizontal lower surface comprising three corresponding cavities 100*a*, 100*b*, 100*c* for receiving the three protrusions 98*a*, 98*b*, 98*c* on the upper surface of the top member of another root end frame or tip end frame in a stacked arrangement. The cavities 100*a*, 100*b*, 100*c* are shown in the isolated top view of the bottom member 86 in FIG. 8. The root frame assembly 64 also comprises two ladders 75 to allow operational staff to mount or remove components.

FIG. 9 is a sectional view along the line B-B' in FIG. 6. It illustrates the first lateral frame part 72 and the second lateral frame part 74 being rigidly connected by a transversely extending transverse frame part comprising a horizontally oriented transverse bar 76, first and second reinforcing bars 78, 80 and a transverse base member 82.

As seen in the enlarged view of FIG. 10, the root end receptacle 68 comprises a plurality of through holes 69 for bolting the root end of a wind turbine blade to the root end receptacle 68. The through 69 holes are arranged in three substantially arc-shaped rows to allow for bolting of different root ends of different diameters to the root end receptacle 68. The root end receptacle 68 may be releasably mounted to the root end frame using its clamping region 67, which in this embodiment takes the shape of a bushing shaped clamp. Preferably, the root end receptacle 68 is hingedly mounted to the root end frame, along a horizontal axis, preferably to the horizontal transverse bar 76.

FIG. 11 is a perspective view of another embodiment of a root end receptacle 68 according to the present invention. Here, the root end receptacle 68 comprises a block 102 of material, the block 102 comprising an arched supporting surface 104 for receiving the root end of a wind turbine blade. The arched supporting surface 104 may be made of rubber. It corresponds to part of the outer surface of the root end of a wind turbine blade. The root end receptacle 68 of FIG. 11 also comprises an attachment plate 106 for fastening the root end receptacle 68 to the frame. The block 102 may comprise a number of upwardly open spaces, such as slits or receptacles that may receive fastening members, such as stay bolts inserted into the root end of the blade. The block 102 has the advantage that the blade root may be removed from the block 102 by vertically lifting the blade root. The block 102 may be used as a standalone or in combination with the afore-mentioned frame or frame assembly.

FIG. 12 is a perspective view of a tip frame assembly according to the present invention. The tip frame assembly 66 comprises a tip end receptacle in the form of a tip end clamp 70 for receiving a wind turbine blade close to its tip end. The clamp 70 has a supporting surface 71, preferably made of non-scratching material. The tip end clamp 70 is mounted to the tip end frame such that it is slidable in a substantially horizontal, spanwise direction.

The invention is not limited to the embodiments described herein, and may be modified or adapted without departing from the scope of the present invention.

LIST OF REFERENCE NUMERALS 2 wind turbine
4 tower
6 nacelle
8 hub
10 blade
14 blade tip
16 blade root
18 leading edge
20 trailing edge
22 pitch axis
30 root region
32 transition region
34 airfoil region
40 shoulder/position of maximum chord
50 airfoil profile
52 pressure side
54 suction side
56 leading edge
58 trailing edge
60 chord
62 camber line/median line
64 root frame assembly
66 tip frame assembly
67 clamping region of root end receptacle
68 root end receptacle
69 through holes
70 tip end receptacle
71 supporting surface of tip end receptacle
72 first lateral frame part
74 second lateral frame part
75 ladder
76 horizontal transverse bar
78 first reinforcing bar
80 second reinforcing bar
82 transverse base member
84 top member
86 bottom member
88 center beam
90 first upper inclined beam
92 second upper inclined beam
94 first lower inclined beam
96 second lower inclined beam
97a, 97b trapezoid shaped blocks
98a, 98b, 98c protrusions of top member
100a, 100b, 100c cavities of bottom member
102 block of material
104 arched supporting surface
106 attachment plate
c chord length
$d_t$ position of maximum thickness
$d_f$ position of maximum camber
$d_p$ position of maximum pressure side camber
f camber
L blade length
r local radius, radial distance from blade root
t thickness
$\Delta y$ prebend
S section of trailing edge

The invention claimed is:

1. A transportation and storage system for a wind turbine blade (10), the blade having a profiled contour including a pressure side (52) and a suction side (54), and a leading edge (18) and a trailing edge (20) with a chord (60) having a chord length extending therebetween, the wind turbine blade (10) extending in a spanwise direction between a root end (16) and a tip end (14), wherein the system comprises a root frame assembly comprising at least one root end receptacle (68) and a root end frame, wherein the root end receptacle (68) is mounted to the root end frame, the system further comprising a tip frame assembly comprising at least one tip end receptacle (70) and a tip end frame, wherein the tip end receptacle (70) is mounted to the tip end frame, wherein the root end frame and/or the tip end frame each comprises a first lateral frame part (72) and a second lateral frame part (74) being laterally spaced apart and being mutually rigidly connected by means of at least one transversely extending transverse frame part, wherein at least one of the first and second lateral frame parts comprise:
   a top member (84) arranged substantially horizontally;
   a bottom member (86) arranged substantially horizontally opposite the top member (84);
   a center beam (88) arranged substantially vertically and connecting the top member (84) to the bottom member (86);
   a first and a second upper inclined beam (90, 92) arranged in a V-shaped configuration, wherein each upper inclined beam extends between the top member (84) and the center beam (88); and
   a first and a second lower inclined beam (94, 96) arranged in a V-shaped configuration, wherein each lower inclined beam extends between the bottom member (86) and the center beam (88).

2. The transportation and storage system for a wind turbine blade according to claim 1, wherein the first upper inclined beam (90) and the second upper inclined beam (92) form an acute angle and/or wherein the first lower inclined beam (94) and the second lower inclined beam (96) form an acute angle.

3. The transportation and storage system for a wind turbine blade according to claim 1, wherein the respective first and second upper inclined beams and the respective first and second lower inclined beams are fastened to the center beam (88) within a region of the center beam (88) which is spaced from the upper and lower end thereof by at least 30% of the total vertical length of the center beam (88).

4. The transportation and storage system for a wind turbine blade according to claim 1, wherein the tip end frame and the root end frame each comprise lower stacking means (100*a*, 100*b*, 100*c*) in a base part thereof and upper stacking means (98*a*, 98*b*, 98*c*) at a top thereof.

5. The transportation and storage system for a wind turbine blade according to claim 1, wherein the top member (84) comprises a substantially horizontal upper surface, said upper surface comprising one or more protrusions (98*a*, 98*b*, 98*c*), and wherein the bottom member (86) comprises a substantially horizontal lower surface, said lower surface comprising one or more cavities (100*a*, 100*b*, 100*c*) for receiving the one more protrusion on the upper surface of the top member (84) of another root end frame or tip end frame in a stacked arrangement.

6. The transportation and storage system for a wind turbine blade according to claim 1, wherein two trapezoid shaped blocks (97*a*, 97*b*) are secured to opposite sides of the center beam (88) for receiving end portions of the first and second upper and lower inclined beams.

7. The transportation and storage system for a wind turbine blade according to claim 1, wherein the root end receptacle (68) is hingedly mounted to the root end frame.

8. The transportation and storage system for a wind turbine blade according to claim 1, wherein the root end receptacle (68) is releasably mounted to the root end frame.

9. The transportation and storage system for a wind turbine blade according to claim 1, wherein the system comprises two root end receptacles (68) mounted to the root end frame.

10. The transportation and storage system for a wind turbine blade according to claim 1, wherein each root end receptacle (68) comprises a plurality of through holes (69) for bolting the root end of a wind turbine blade to the root end receptacle (68).

11. The transportation and storage system for a wind turbine blade according to claim 1, wherein the root end receptacle (68) comprises a block of material, said block comprising an arched supporting surface for receiving the root end of a wind turbine blade.

12. The transportation and storage system for a wind turbine blade according to claim 1, wherein the tip end receptacle (70) is slidable in at least one direction.

13. The transportation and storage system for a wind turbine blade according to claim 1, wherein the transverse frame part comprises one or more horizontally arranged bars interconnecting the first and second lateral frame parts (74).

14. The transportation and storage system for a wind turbine blade according to claim 13, wherein the horizontally arranged bar has a circular cross section for receiving at least one clamp ring of a root end receptacle (68).

15. The transportation and storage system for a wind turbine blade according to claim 1, wherein the first and the second upper inclined beams (90, 92) are extending in the same plane.

16. The transportation and storage system for a wind turbine blade according to claim 1, wherein the first and the second lower inclined beams (94, 96) are extending in the same plane.

17. The transportation and storage system for a wind turbine blade according to claim 1, wherein the first lateral frame part (72) extends in a first lateral plane and/or the second lateral frame part (74) extends in a second lateral plane.

18. The transportation and storage system for a wind turbine blade according to claim 17, wherein the first lateral plane and/or the second lateral plane are perpendicular to the at least one transversely extending transverse frame part.

19. The transportation and storage system for a wind turbine blade according to claim 1, wherein the root end receptacle (68) is mounted to the center beam (88) of the first lateral frame part (72) and/or the center beam (88) of the second lateral frame part (74).

20. The transportation and storage system for a wind turbine blade according to claim 1, wherein the tip end receptacle (70) is mounted to the center beam (88) of the first lateral frame part (72) and/or the center beam (88) of the second lateral frame part (74).

21. The transportation and storage system for a wind turbine blade according to claim 2, wherein the acute angle formed between the first upper inclined beam (90) and the second upper inclined beam (92) is equal to the acute angle formed between the first lower inclined beam (94) and the second lower inclined beam (96), and/or wherein the first upper inclined beam (90) has the same length as the second upper inclined beam (92) and/or wherein the first lower inclined beam (94) has the same length as the second lower inclined beam (96), and/or wherein the center beam (88), the first and second upper inclined beams and the first and second lower inclined beams are arranged symmetrically.

22. The transportation and storage system for a wind turbine blade according to claim 7, wherein the root end receptacle (68) is hingedly mounted to the root end frame along a horizontal axis, and wherein the tip end receptacle (70) is slidable in the horizontal direction.

* * * * *